(12) United States Patent
Poppert

(10) Patent No.: US 6,233,557 B1
(45) Date of Patent: May 15, 2001

(54) METHOD OF SELECTIVELY ASSIGNING A PENALTY TO A PROBABILITY ASSOCIATED WITH A VOICE RECOGNITION SYSTEM

(75) Inventor: Daniel C. Poppert, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/256,031

(22) Filed: Feb. 23, 1999

(51) Int. Cl.[7] ................................................. G10L 15/14
(52) U.S. Cl. ........................................ 704/250; 704/257
(58) Field of Search ................................. 703/240, 256, 703/255, 246, 250; 704/240, 250, 231, 255, 256, 257, 246

(56) References Cited

U.S. PATENT DOCUMENTS

| | | | |
|---|---|---|---|
| 4,481,593 | 11/1984 | Bahler | 364/513.5 |
| 4,761,815 | * 8/1988 | Hitchcock | 704/253 |
| 5,054,084 | * 10/1991 | Tanaka et al. | 704/254 |
| 5,129,000 | * 7/1992 | Tanaka | 704/246 |
| 5,148,471 | 9/1992 | Metroka et al. | 364/513.5 |
| 5,335,261 | 8/1994 | Fujinaka | 379/58 |
| 5,638,425 | * 6/1997 | Meador, III et al. | 379/88.01 |

FOREIGN PATENT DOCUMENTS

| | | | |
|---|---|---|---|
| 0243009A1 | 10/1987 | (EP) | G10L/5/06 |
| 0720338A2 | 7/1996 | (EP) | H04M/1/00 |
| 2159996 | 12/1985 | (GB) | G10L/7/08 |
| 2179483 | 3/1987 | (GB) | G10L/5/06 |
| 2240203 | 7/1991 | (GB) | G10L/5/06 |
| 2248513 | 4/1992 | (GB) | A61B/5/117 |
| 2327555 | 1/1999 | (GB) | H04M/1/27 |
| 2333877 | 8/1999 | (GB) | G10L/5/06 |
| WO 90/08439 | 7/1990 | (WO) | . |
| WO 95/10833 | 4/1995 | (WO) | G10L/9/00 |

* cited by examiner

*Primary Examiner*—Richemond Dorvil
(74) *Attorney, Agent, or Firm*—Randall S. Vaas; Michael C. Soldner

(57) ABSTRACT

A voice recognition system (204, 206, 207, 208) assigns a penalty to a score in a voice recognition system. The system generates a lower threshold for the number of frames assigned to at least one state of at least one model and an upper threshold for the number of frames assigned to at least one state of at least one model. The system assigns an out of state transition penalty to an out of state transition score in an allocation assignment algorithm if the lower threshold has not been met. The out of state transition penalty is proportional to the number of frames that the dwell time is below the lower threshold. A self loop penalty is applied to a self loop score if the upper threshold number of frames assigned to a state has been exceeded. The out of state transition penalty is proportional to the number of frames that the dwell time is above the upper threshold.

7 Claims, 6 Drawing Sheets

METHOD OF SELECTIVELY ASSIGNING A PENALTY TO A PROBABILITY ASSOCIATED WITH A VOICE RECOGNITION SYSTEM

FIELD OF THE INVENTION

The present invention pertains to voice recognition systems, and more particularly to system assigning probabilities in a state allocation algorithm.

BACKGROUND OF THE INVENTION

Speaker dependent speech recognition systems use a feature extraction algorithm to perform signal processing on a frame of the input speech and output feature vectors representing each frame. This processing takes place at the frame rate. The frame rate is generally between 10 and 30 ms, and will be exemplified herein as 20 ms in duration. A large number of different features are known for use in voice recognition systems.

Generally speaking, a training algorithm uses the features extracted from the sampled speech of one or more utterances of a word or phrase to generate parameters for a model of that word or phrase. This model is then stored in a model storage memory. These models are later used during speech recognition. The recognition system compares the features of an unknown utterance with stored model parameters to determine the best match. The best matching model is then output from the recognition system as the result.

It is known to use a Hidden Markov Model (HMM) based recognition system for this process. HMM recognition systems allocate frames of the utterance to states of the HMM. The frame-to-state allocation that produces the largest probability, or score, is selected as the best match.

One problem with HMMs is that they assume an exponential distribution for the duration of a state. This is fundamental to the Markov process assumption, which assumes that the state transitions for frame $F_t$ are dependent only on the state of the system at frame $F_{t-1}$. This model does not fit speech especially well. For this reason some modem recognition systems break the Markov assumption and assign state transition penalties which are related to the duration of a state.

In particular, it is known to simply bound the state duration to a minimum and maximum that are estimated during the training process. Thus a hard, bounded limit is set on the state duration such that a minimum number of frames are allocated to a state before transitions out of the state are allowed and once a maximum state dwell time is met, additional self loops are not allowed. Using state duration information in the determination of transition probabilities breaks the Markov process assumption, but typically yields better recognition results.

More complex systems having large amounts of training data can accurately model state transition probabilities as a function of the state duration. However for applications in which as few as two utterances are used to train an HMM, it is difficult to estimate accurate probability distributions for the state transition penalties because of the small amount of training data. Accordingly, the penalties may produce erroneous results.

Consequently there is a need for an improved system of using state duration information to generate transition penalties in a system having minimal training information.

DETAILED DESCRIPTION OF THE DRAWINGS

This efficient method assigns a transition penalty to an out of state transition score if a lower threshold number of frames assigned to that state (the state duration) has not been met. A self loop penalty is applied if a maximum threshold number of frames assigned to a state has been exceeded. No penalty is assigned for out-of-state transitions after the lower threshold has been met, and no penalty is assigned for same-state transitions until the maximum threshold has been exceeded. The performance of speech recognition systems is improved with only a modest increase in the memory size and millions of instructions per second (MIPS) requirements. The self loop penalty can be effectively employed in systems with limited training data, such as systems having only two training utterances, by which to generate the penalty.

Figure 1:
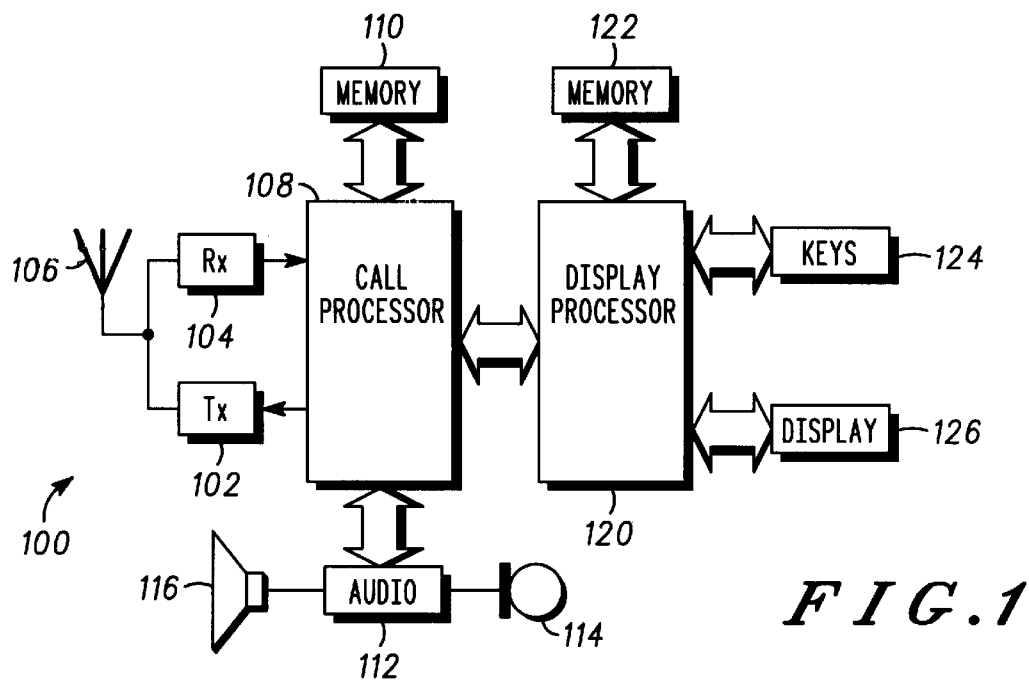
FIG. 1 is a circuit schematic in block diagram form illustrating a wireless communication device.

A device 100, in which the invention can be advantageously employed is disclosed in FIG. 1. The device 100 is described to be a portable radiotelephone herein for illustrative purposes, but could be a computer, a personal digital assistant, or any other device that can advantageously employ voice recognition, and in particular a device which can take advantage of a memory efficient voice recognition system. The illustrated radiotelephone includes a transmitter 102 and a receiver 104 coupled to an antenna 106. The transmitter 102 and receiver 104 are coupled to a call processor 108, which performs call processing functions. The call processor 108 can be implemented using a digital signal processor (DSP), a microprocessor, a microcontroller, a programmable logic unit, a combination of two or more of the above, or any other suitable digital circuitry.

The call processor 108 is coupled to a memory 110. Memory 110 contains RAM, electronically erasable programmable read only memory (EEPROM), read only memory (ROM), flash ROM, or the like, or a combination of two or more of these memory types. The memory 110 supports operation of the call processor 108, including the voice recognition operation, and must include an electronically alterable memory to support the state transition path memory described in greater detail herein below. The ROM can be provided to store the device operating programs.

An audio circuit 112 provides digitized signals from a microphone 114 to all processor 108. The audio circuit 112 drives speaker 116 responsive to digital signals from the call processor 108.

The call processor 108 is coupled to a display processor 120. The display processor is optional if additional processor support is desired for the device 100. In particular, the display processor 120 provides display control signals to the display 126 and receives inputs from keys 124. The display processor 120 can be implemented using a microprocessor, a microcontroller, a digital signal processor, a programmable logic unit, a combination thereof, or the like. A memory 122 is coupled to the display processor to support the digital logic therein. The memory 122 can be implemented using RAM, EEPROM, ROM, flash ROM, or the like, or a combination of two or more of these memory types.

Figure 2:
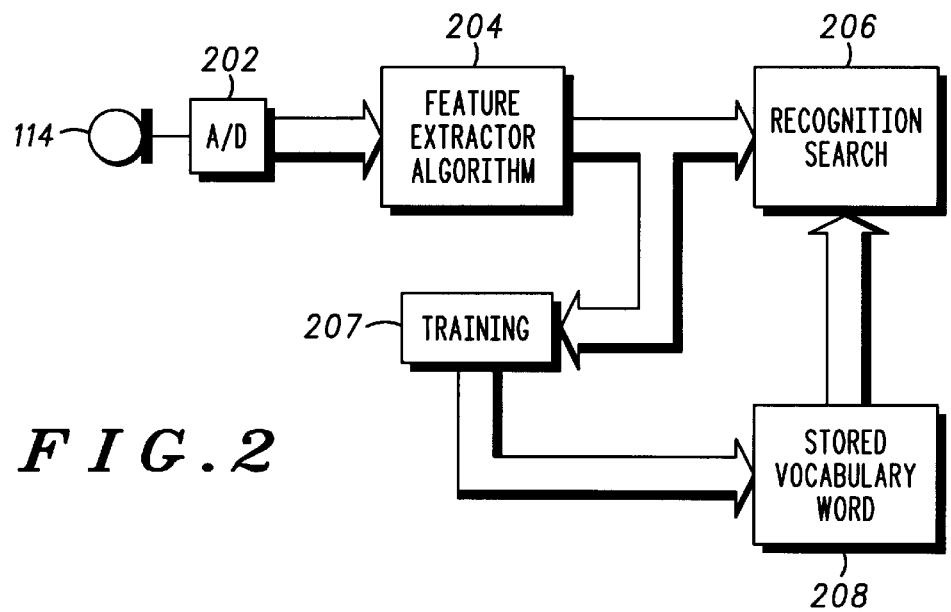
FIG. 2 is a circuit schematic in block diagram form illustrating a voice recognition system in the device according to FIG. 1.

With reference to FIG. 2, the audio signals received by microphone 114 are converted to digital signals in an analog-to-digital converter 202 of audio circuit 112. Those skilled in the art will recognize that the audio circuit 112 provides additional signal processing, such as filtering, which are not described herein for brevity. The call processor, 108, performs feature extraction 204 on the processed digital signal representation of the analog signal output by microphone 114 and produces a set of feature vectors representative of the user utterance. A feature vector is produced for each short time analysis window. The short time analysis window is a frame, which in the example illustrated herein is 20 ms. Thus there is one feature vector per frame. The processor 108 uses the features for speech recognition 206 or training 207.

In training, the feature vectors of the utterance are used to create templates in the form of HMMs which are stored in memory 208. In speech recognition, the feature vectors representing the input utterance are compared to the templates of stored vocabulary words in memory 208 to determine what the user said. The system may output the best match, a set of the best matches, or optionally, no match. Memory 208 is preferably a non-volatile memory portion of memory 110 (FIG. 1), and may for example be an EEPROM or flash ROM. As used herein, "words" can be more than one word, such as "John Doe," or a single word such as "call".

As mentioned briefly above, the stored vocabulary words in memory 208 are created in a training mode. For example, stored vocabulary words are each initially derived from two training signals, utterances U1 and U2 (FIG. 3), composed of respective feature vectors. Utterance U1 represents the signal stored the first time that a speaker says a particular word during training. Utterance U2 represents the signal the second time a speaker says a particular word during training. In the illustrated example, utterance U1 is of a different length than utterance U2. Those skilled in the art will recognize that more or fewer utterances may be used.

Each utterance is segmented into frames of feature vectors. The frames may be 20 ms in length, for example. A feature vector may be generated in any conventional manner. For example, a feature vector may comprise cepstral and delta-cepstral features that are generated from the output of A/D converter 202 (FIG. 2).

Figure 5:
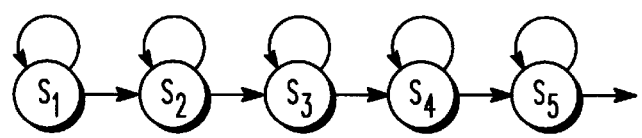
FIG. 5 illustrates a left to right, no skip HMM corresponding to FIG. 4.
Figure 3:
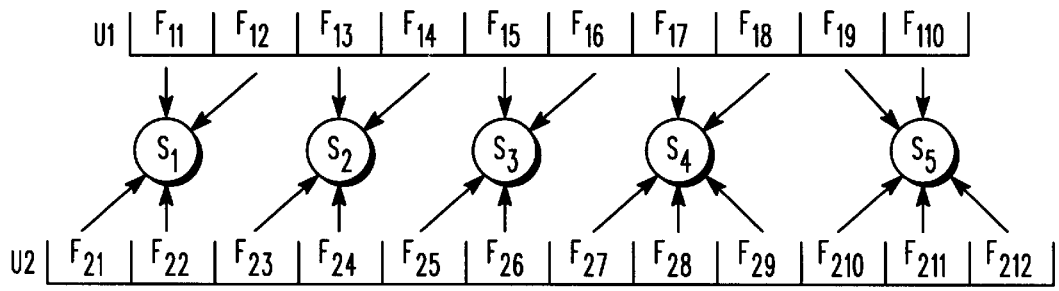
FIG. 3 is an illustration of a left-right Hidden Markov Model with two associated speech utterances segmented into frames.
Figure 4:
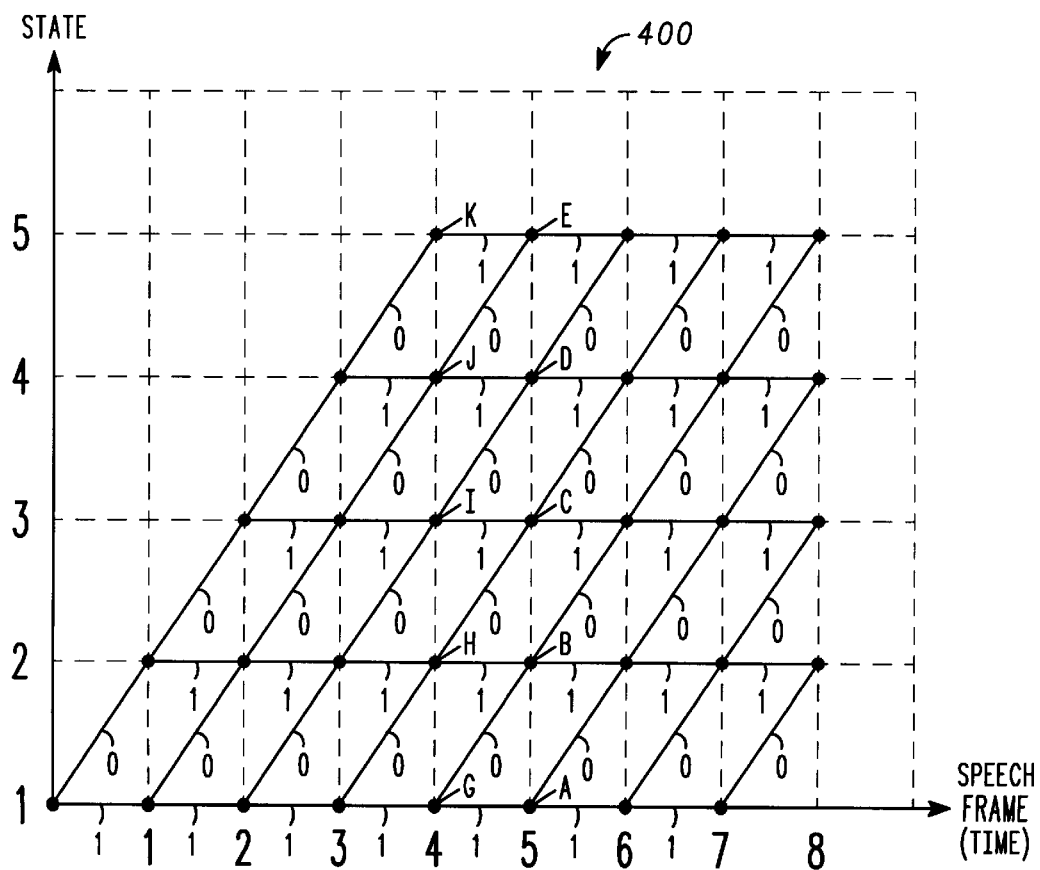
FIG. 4 is a diagram illustrating the traceback lattice associated with all of the possible state transitions in a left-right model with no skip transitions allowed.

In the example used herein, and as illustrated in FIGS. 3–5, the HMM has five states that are used regardless of the length of the utterance. Those skilled in the art will recognize that any number of states may be used, and it is envisioned that more than ten states will be employed for each utterance. Additionally, the number of states may be fixed regardless of the length of the utterance, or the number of states can depend on the length of the utterance. The remaining discussion will be made with respect to a system using five states for any utterance, regardless of its length.

Figure 6:
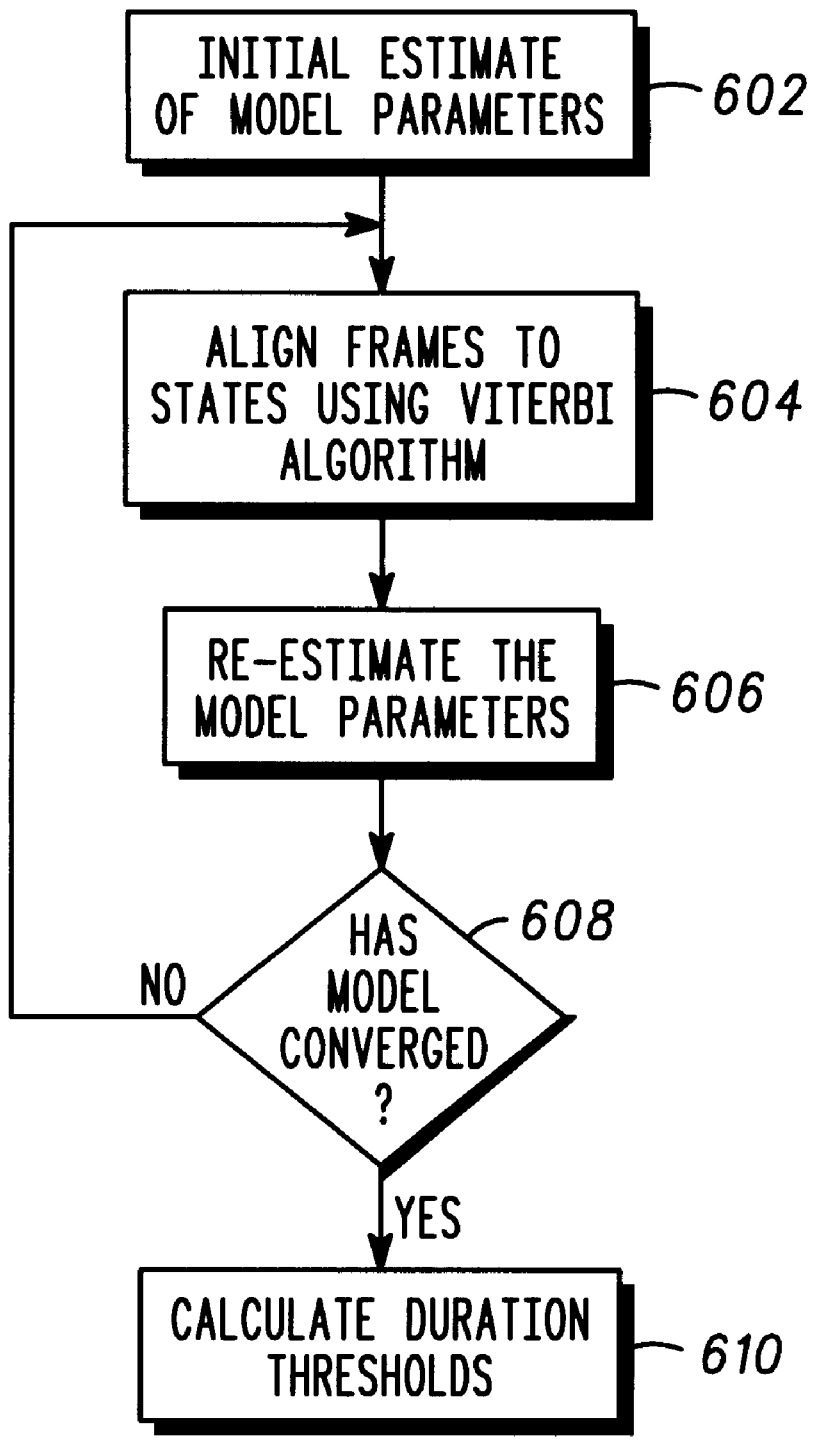
FIG. 6 is a high level flow chart illustrating the training algorithm.

As previously mentioned the purpose of training is to generate an HMM for the utterance. This is illustrated in FIG. 6. It starts at step 602, where an initial estimate of the model parameters is made. For example, with reference to FIG. 3, initially, state 1 (S1) is formed from frames F11 and F12 of utterance U1, and frames F21 and F22 of utterance 2. These frame values are used to initially calculate some or all of the parameters composing the statistical representation of State 1. In the preferred embodiment, the statistical representation is a mean of frames from utterance U1 and utterance U2. Thus, state 1 is initially set to the mean of frames F11 and F12 of utterance U1 and frames F21 and F22 of utterance U2. Those skilled in the art will recognize that a variance can also be included in the state. Statistical representations of the other frames are also generated. The second state S2 is the mean of the values of frames F13 and F14 of utterance U1 and frames F23 and F24 of utterance U2. The state S3 is similarly the mean of the values of frames F15 and F16 of utterance U1 and frames F25 and F26 of utterance U2. The state S4 is the mean of frames F17 and F18 of utterance U1 and frames F27, F28 and F29 of utterance U2. The above frame allocation is provided as an example of how the frames may be initially allocated to states and how a statistical representation of a state could be formed. However, those skilled in the art will recognize that numerous other methods exist both for initial allocation of states and for statistically representing a state, and thus it is not intended that the invention be limited to the above environment.

For each utterance, an alignment algorithm, such as a Viterbi algorithm, is used to make an assignment of the frames of an utterance, such as U1, to the states of the model at step 604. In step 606, the model is re-estimated based upon the alignment performed in step 606. In step 608, the processor determines if the model has converged by observing the change in the model parameters. Convergence occurs when aligning the sample utterances to the state model produces less than a predetermined amount of change in the state model. If convergence is not detected in step 608, the alignment algorithm is performed again at step 604.

Those skilled in the art will recognize that a number of different algorithms are known for aligning and estimating the model parameters, and for detecting convergence, any suitable one of which may be used with the invention, such that they are not described in greater detail herein.

Once convergence is achieved, the lower and upper state duration thresholds $Dmin_i$ and $Dmax_i$ for every state must be computed, as indicated in step 610.

Figure 7:
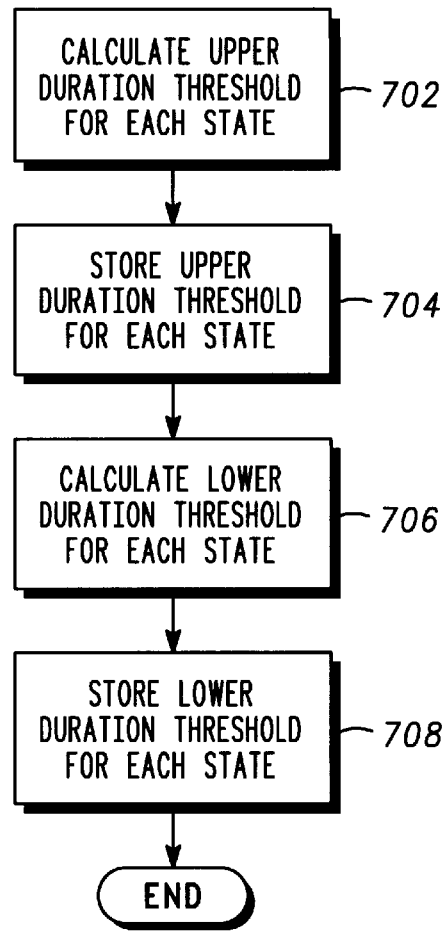
FIG. 7 is a flow chart illustrating the setting of an upper and lower duration threshold.

FIG. 7 illustrates in greater detail the calculation of the duration thresholds involved at step 610 (FIG. 6). After a model has been created and stored in memory 208, the processor 108 calculates the upper duration threshold for each state of the model as indicated in same 702. The upper duration threshold calculated for each state is stored as indicated in step 704. The lower state duration threshold for each state in the model is calculated in step 706. The lower state duration threshold for each state is then stored, as indicated in step 708. These lower and upper thresholds are stored in memory 110 along with the HMM parameters which can be used in the voice recognition process as described in greater detail herein below.

In particular, the upper and lower duration thresholds are calculated from the HMM model information using the minimum and maximum number of frames that were assigned to each state at step 604 and adjusting them slightly by factors $Dmin_{tweak}$ and $Dmax_{tweak}$ as follows:

$Dmin_i = (1 - Dmin_{tweak}) * min(D_{1,i}, D_{2,i});$ $Dmax_i = (1 + Dmax_{tweak}) * max(D_{1,i}, D_{2,i});$ Where $D_{1,i}$ is the number of frames assigned to state i from utterance 1, and $D_{2,i}$, is the number of frames assigned to state i from utterance 2. Those skilled in the art will recognize that more than two utterances can be used.

The adjustment is always positive, so that it has a tendency to make the minimum a little bit smaller and the maximum a little bit bigger than what was observed in the actual model. For example, $Dmin_{tweak}$ and $Dmax_{tweak}$ may be 0.1. Those skilled in that art will recognize that the actual values may vary without deviating from the invention. One particularly advantageous method of retrieving the state duration (the values $D_{1,i}$, $D_{2,i}$ mentioned above) is set forth in copending patent application // Docket Number CS10103, entitled METHOD OF TRACEBACK MATRIX STORAGE IN SPEECH RECOGNITION SYSTEM, filed in the name of Jeffrey Arthur Meunier et al. on the same date as this application, the disclosure of which is incorporated herein by reference thereto.

FIG. 5 illustrates the left-right, no skip HMM. During recognition, the call processor 108 employs an alignment algorithm, such as a Viterbi algorithm, to align the utterance to be recognized with the states of each HMM created during training. In particular, the alignment algorithm operates to determine the best path back from any point based upon a score for each path considered, as will be described generally with respect to FIG. 4. As used herein, a point is a frame and state location in the lattice 400. A path extends through the points.

Those skilled in the art will recognize that lattice 400 (FIG. 4) shows all paths back from states 1 through 5 for 8 frames. An additional limitation is that frames must be allocated to either the same state as a previous frame or the state immediately after the state of the previous frame (no states can be skipped). This is consistent with the allocation of frames to states in a speech recognition system and significantly reduces the amount of traceback information needed to record a data path. Such restriction of the possible paths from state to state within the model helps better model the sequential, ordered nature of acoustic events in a speech utterance. Generally, HMM state transitions are restricted to being left-right in nature as shown in FIG. 4, where the allowable paths into a particular state n come either from that state (a "self loop" from Sn to Sn) or the preceding state (a "single step transition" to Sn from S(n-1)). Such HMM architectures have proven effective for many speech recognition tasks.

By way of example, the Viterbi algorithm for frame 5 (number 5 on the horizontal axis in FIG. 4) determines the best path back from each of the states (state 1 (S1), state 2 (S2), state 3 (S3), state 4 (S4), and state 5 (S5)) in frame 5 (i.e., the path back from each of the states that produces the best score). In particular, the algorithm considers a score, or probability, for the path back from point A, which represents the probability that the path lies through state 1 for all of the first five frames. This is necessitated because of the condition that the current frame must be either the same state as the previous frame or one state higher than the state of the previous frame.

The algorithm generates for point B the score associated with the path back from point B that passes through point G and the score for the path back from point B that passes through point H. For point C, the Viterbi algorithm generates the scores associated with the path from point C that passes through point H and the score associated with the path back from point C that passes through point I. For point D, the Viterbi algorithm considers the score associated with the path back from point D that passes through point I and the score associated with the path back from point D that passes through point J. For point E, the Viterbi algorithm generates the score associated with the path back from point E that passes through point J and the score associated with the path back from point E that passes through point K. After calculating the scores, the path transition type producing the highest score for each state is saved as the path into each state of frame five.

Figure 9:
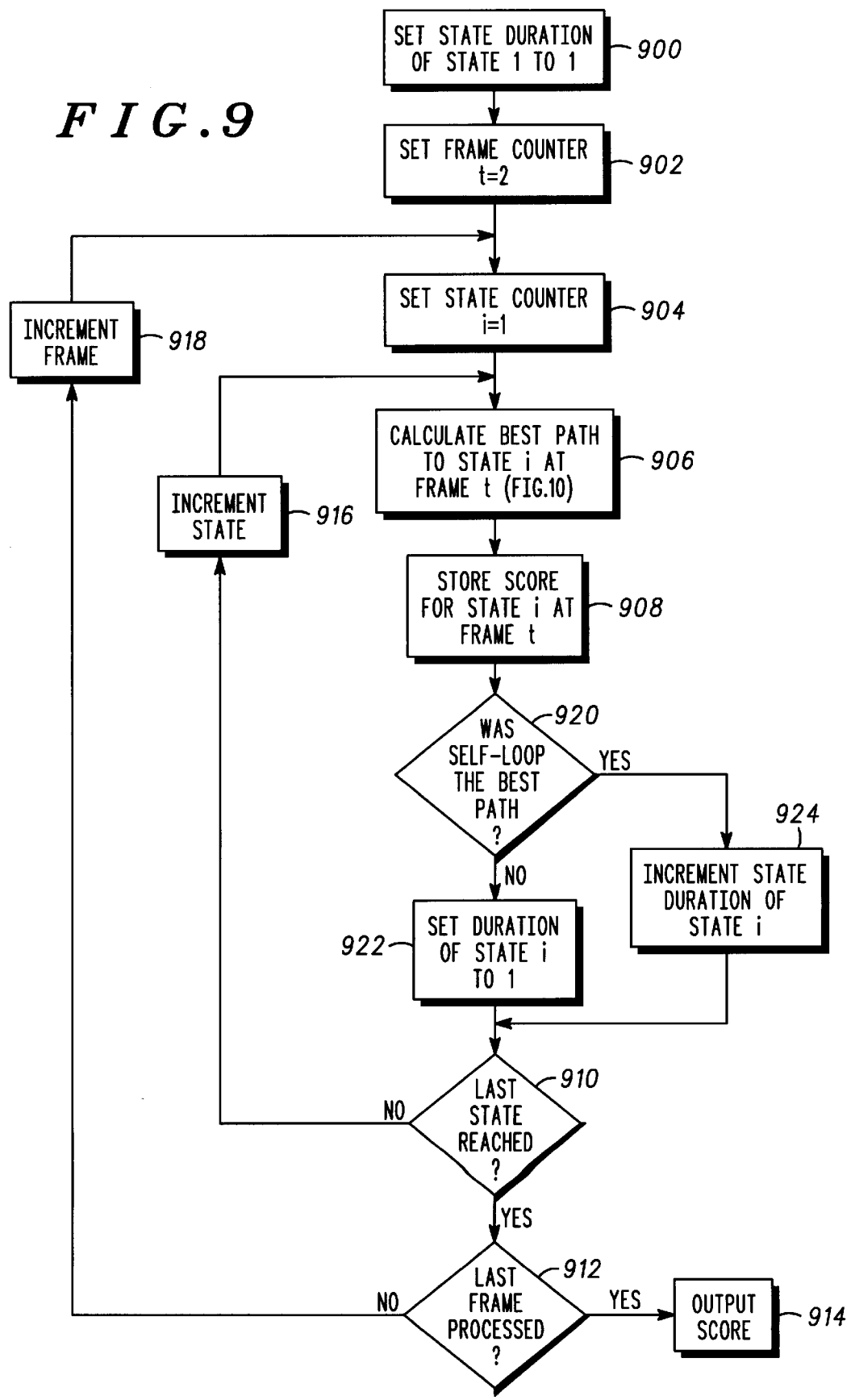
FIG. 9 is a flow chart illustrating the voice recognition system.

FIG. 9 further illustrates the alignment algorithm that takes place during recognition between the features vectors of the utterance and the states of the stored models generated during training. The alignment algorithm illustrated in FIG. 9 is performed for each word, or model, in the stored vocabulary, and the best output score is output as the matched word. The first frame is automatically assigned to state 1, so its state duration counter is initialized to 1 at step 900, and the frame counter is set such that t=2, as indicated in step 902. The processor 108 then sets the state counter i=1 as indicated in step 904. The processor in step 906 calculates the best path to state i at frame t, described in greater detail in the description of FIG. 10.

The score for the state at frame t is stored as indicated in step 908. At step 920, the transition type is checked to see if a self loop was the best path to state i. If the self loop was the best path, then a state duration counter is incremented at step 924. If the self loop was not the best path, then the state duration counter is reset to 1 at step 922.

In step 910, the processor 108 makes a decision as to whether the last state was reached. If not, the state counter i is incremented as indicated in step 916 and the processor returns to step 906. Otherwise, the processor determines in step 912 whether the last frame was processed, as indicated in step 912. If not, the frame counter is incremented in step 918 and the processor returns to step 904. If the last frame was processed, as indicated in step 912, the score for the last state of the model is output at block 914 and is then compared to the scores of all other models in the vocabulary. The highest score for all of the models will be chosen as the correct match of the utterance to one of the models.

The state transition probabilities for both a transition and a self loop, for each state, will be generated. The upper and lower duration limits stored for the states of each model are used when performing the alignment algorithm.

The description of how the state transition score will be calculated using the penalty will now be described with reference to FIG. 10. Initially, the state transition probability from state i-1 is generated as indicated in block 1010. The processor 108 determines in step 1012 whether the state dwell time of the previous state has already exceeded the min threshold as indicated in decision block 1012. If it less than the lower threshold, the processor calculates a proportional penalty, as indicated in step 1014. The penalty is added to the score to produce an adjusted score. If it was determined that the state duration was greater than the minimum threshold, the adjustment to the score is adding 0. The resulting adjusted score from step 1013 or 1016 is stored as indicated in step 1017.

The self loop score will be calculated as indicated in block 1018. The processor determines in step 1020 whether the state dwell time has already exceeded the upper threshold. If the state duration is greater than the upper threshold, the processor 110 calculates a proportional penalty, as indicated in step 1024. The penalty is added to the score to produce an adjusted score as indicated in step 1026. If it was determined in step 1020 that the state duration was less than the upper threshold, the adjusted score is not altered as indicated in step 1022. The resulting adjusted score from either step 1022 or step 1026 is stored as indicated in step 1027.

The processor 108 then selects one of a self loop or a transition depending on which transition type had the higher adjusted score as indicated in step 1028. If the step had the highest adjusted score, then the step transition type is stored in step 1030. If the self loop had the higher adjusted score, then the self loop transition type will be stored in step 1030. Those skilled in that art will recognize that the out of state transition penalty will be applied to a state skip score just as it is applied to the step score if state skips are allowed. Thus the illustrated example can be readily extended to a state skip HMM.

Figure 10:
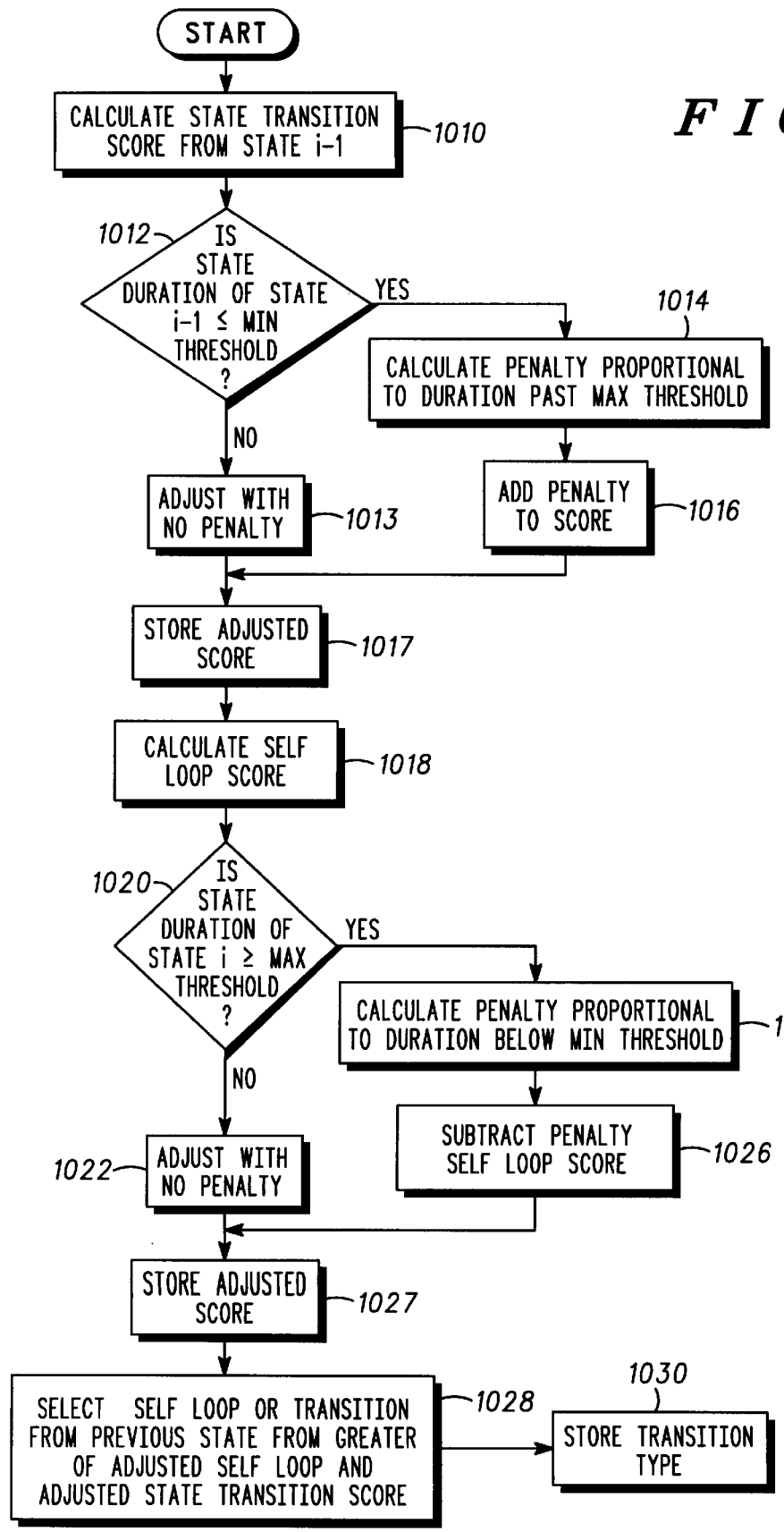
FIG. 10 is a flow chart illustrating the setting of a penalty to a score in the voice recognition system.

Those skilled in the art will recognize that the routine illustrated in FIG. 10 is called for each frame and state for purposes of selectively applying the penalty to each state of each frame.

Figure 8:
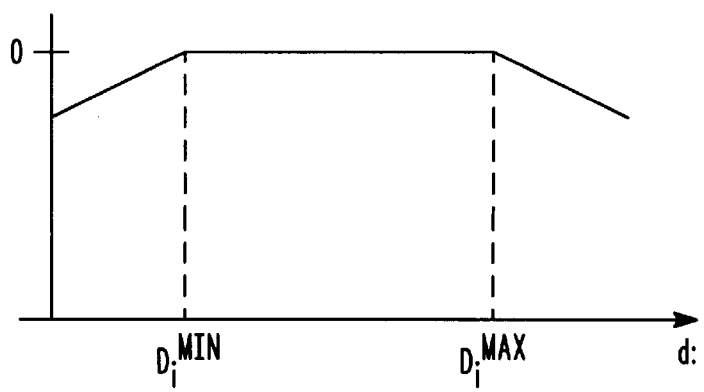
FIG. 8 illustrates the penalty applied to one state of one model.

During recognition, the size of the penalty assigned is proportional to the amount by which the duration is short of the lower threshold or has exceeded the maximum threshold. The penalty $Po_i(d_i)$ is to be allocated for an out-of-state transition and the penalty $Ps_i(d_i)$ is to be allocated for a self loop, where $d_i$ is the current duration of state i of the HMM. Calling the minimum duration of state i $Dmin_i$ and the maximum duration $Dmax_i$, the penalty $Po_i(d_i)$ assigned for an out-of-state-transition is:

$Po_i(d_i)=0$, for $d_i$ greater than or equal to $Dmin_i$;

$Po_i(d_i)=p^o(Dmin_i-d_i)$, for $d_i$ less than $Dmin_i$ where $p^o$ is the out-of-state transition penalty factor. Similarly, the same-state transition penalties $Ps_i(d_i)$ are assigned as:

$Ps_i(d_i)=0$, for $d_i$ less than or equal to $Dmax_i$;

$Ps_i(d_i)=p^s(d_i-Dmax_i)$, for $d_i$ greater than $Dmax_i$ where $p^s$ is the same-state transition penalty factor. A plot of these penalties are shown in FIG. 8.

The penalty factors are figures selected to make the penalty proportional to is other values in the equation for generating a path score. For example the values can be between −1 and −10, and they can be the same or different.

In summary, the probability of each state after the first frame is determined by comparing the probability of a transition into that state from the previous state (a state change) to the probability of a self-transition (a self-loop). The probability of a transition from the previous state is evaluated as the sum of the previous state's cumulative log-probability with the probability of an out of state transition as:

$C_{i-1}(m)+Po_{i-1}(d_{i-1})$.

The probability of a same-state transition is determined as the sum of the current state's cumulative probability with the probability of a self-transition as:

$C_i(m)+Ps_i(d_i)$.

Addition is used instead of multiplication because log-probabilities are being evaluated. The higher of the two probabilities is chosen as the winner. This probability is then added to the observation probability $o_i(f_m)$, where $f_m$ is a vector of m features, and that probability is stored as $C_i(m+1)$.

Thus it can be seen that an improved algorithm for matching frame vectors to states is disclosed. A lower and upper state duration threshold is stored for each state of each HMM in memory 208. Thus, every model stored in memory has a respective upper and lower threshold for each state. However, this represents only a modest increase in memory requirements and gives a considerable improvement in recognition performance.

Using this method not only allows for lower MIPS and low memory requirements, but since only a minimum and maximum state duration are needed, they can be easily estimated from the training data. The proportional nature of the penalty assigned allows the algorithm to be used even with models using a minimal number of training utterances.

The penalty is linearly proportional to the distance from the upper and lower transition thresholds. However, other functional relations could be used, and applicants have successfully implemented other functions such as the square of the distance. It was not found that these more complicated functions outperform the preferred linear function illustrated herein.

In most conditions the novel state duration method gives significantly improved recognition results over both having no state duration penalties and using the HMM/BSD technique. The HMM technique of the prior art having a bounded, hard state duration, did not work well with a recognition system using a small number, such as two, training utterances. For systems with very little training data, the penalty algorithm seems to be much more effective.

Thus it can be seen that an improved method of calculating a state transition is disclosed. This efficient method assigns a transition penalty to an out of state transition score if a lower threshold number of frames assigned to that state (the state duration) has not been met. A self loop penalty is applied if a maximum threshold number of frames assigned to a state has been exceeded. No penalty is assigned for out-of-state transitions after the lower threshold has been met, and no penalty is assigned for same-state transitions until the maximum threshold has been exceeded. The performance of speech recognition systems is improved with only a modest increase in the memory size and millions of instructions per second (MIPS) requirements. This improved system can be effectively employed in systems with limited training data, such as system having only two training utterances.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable wireless devices such as cellular radiotelephones, the invention could be applied to any device employing speech recognition, including pagers, electronic organizers, computers, and telephony equipment. The invention should be limited only by the following claims.

What is claimed is:

1. A method of assigning a penalty to a score in a voice recognition system comprising the steps of:
   generating at least one of:
      a lower threshold for the number of frames assigned to at least one state of at least one model;
      and an upper threshold for the number of frames assigned to at least one state of at least one model; and
   assigning at least one of:
      an out of state transition penalty to an out of state transition score in an allocation assignment algorithm, if the lower threshold has not been met, wherein the out of state transition penalty is proportional to the number of frames that a dwell time in the at least one state corresponding to the lower threshold is below the lower threshold;

and a self loop penalty to a self loop score if the upper threshold number of frames assigned to a state has been exceeded, wherein the out of state transition penalty is proportional to the number of frames that a dwell time in the at least one state corresponding to the upper threshold is above the upper threshold.

2. The method as defined in claim 1, further including the step of applying no penalty if the dwell time in the at least one state corresponding to the lower threshold is greater than the lower threshold, and if the dwell time in the at least one state corresponding to the upper threshold is less than the upper threshold.

3. The method as defined in claim 1, wherein the step of assigning a self loop threshold assigns a penalty which gradually increases the longer the dwell time in the at least one state corresponding to the upper threshold remains above the upper threshold.

4. The method as defined in claim 1, wherein upper and lower thresholds are generated for each state of each model stored in the voice recognition system.

5. The method as defined in claim 4, wherein the thresholds for each state of each model are applied when the allocation assignment algorithm is applied to each state for each model.

6. A method of assigning a penalty to a score in a voice recognition system as a function of state duration information, comprising the steps of:

identifying upper and lower state transition thresholds for each of at least one state, each upper and lower state transition threshold derived as a function of a dwell time in the at least one state;

for each state having a lower state transition threshold, assigning a proportional out of state transition penalty to an out of state transition if the dwell time has not reached the lower state transition threshold;

for each state having an upper state transition threshold, assigning a proportional self loop penalty if some maximum number of frames assigned to that state has been exceeded.

7. A wireless communication device utilizing a voice recognition system, comprising:

a microphone for inputting user utterances; and voice recognition circuitry, the voice recognition circuitry generating state models of the user utterance detected by the microphone by allocating frames of the utterance to states in the state model, wherein the state model assigns proportional penalties to scores of the voice recognition system by generating at least one of a lower threshold and an upper threshold for the number of frames assigned to at least one state of at least one model, and assigning at least one of an out of state transition penalty to an out of state transition score if the lower threshold has not been met, wherein the out of state transition penalty is proportional to the number of frames that a dwell time in the at least one state is below the lower threshold, and a self loop penalty to a self loop score if the upper threshold number of frames assigned to a state has been exceeded, wherein the out of state penalty is proportional to the number of frames that a dwell time in the at least one state is above the upper threshold.

* * * * *